United States Patent
Fan et al.

(10) Patent No.: US 8,807,442 B2
(45) Date of Patent: *Aug. 19, 2014

(54) SYSTEM AND METHOD FOR EMBEDDING MACHINE-READABLE CODES IN A DOCUMENT BACKGROUND

(75) Inventors: Zhigang Fan, Webster, NY (US); Yonghui Zhao, Penfield, NY (US); Hengzhou Ding, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 50 days.

This patent is subject to a terminal disclaimer.

(21) Appl. No.: 13/552,177

(22) Filed: Jul. 18, 2012

(65) Prior Publication Data

US 2013/0228630 A1   Sep. 5, 2013

Related U.S. Application Data

(60) Provisional application No. 61/605,475, filed on Mar. 1, 2012.

(51) Int. Cl.
*G06K 19/06* (2006.01)

(52) U.S. Cl.
USPC ............... 235/494; 235/454; 235/462.09

(58) Field of Classification Search
USPC ............... 235/375, 494, 454, 462.09, 485
See application file for complete search history.

(56) References Cited

U.S. PATENT DOCUMENTS

| | | | |
|---|---|---|---|
| 2003/0152293 A1* | 8/2003 | Bresler et al. | 382/305 |
| 2010/0074443 A1* | 3/2010 | Ishii et al. | 380/243 |
| 2011/0032576 A1* | 2/2011 | Kakutani | 358/3.28 |

* cited by examiner

*Primary Examiner* — Sonji Johnson
(74) *Attorney, Agent, or Firm* — Fox Rothschild LLP

(57) ABSTRACT

A method and apparatus are disclosed for embedding a two-dimensional machine-readable code into the background of a document in an aesthetically pleasing manner. The objects (picture, graphics, text, etc.) in a document image are first segmented from the background. A location for embedding the barcode is determined. A texture image is created by replicating the barcode to a size that covers the entire image. A modulation index map is generated from the segmentation results. The original image is modulated to produce the output image based on the texture image and the modulation index map.

20 Claims, 10 Drawing Sheets

SYSTEM AND METHOD FOR EMBEDDING MACHINE-READABLE CODES IN A DOCUMENT BACKGROUND

RELATED APPLICATIONS

This application hereby claims priority under 35 U.S.C. §119 to U.S. Provisional Patent Application No. 61/605,475, filed 1 Mar. 2012, entitled "METHOD FOR EMBEDDING MACHINE READABLE CODES IN A DOCUMENT BACKGROUND," the disclosure of which is incorporated herein by reference.

This application is related to U.S. patent application Ser. No. 13/552,162, filed concurrently hereto, titled SYSTEM AND METHOD FOR CREATING MACHINE-READABLE CODES IN COMBINATION WITH OTHER IMAGES SUCH AS LOGOS; and U.S. patent application Ser. No. 13/552,170, filed concurrently hereto, titled SYSTEM AND METHOD FOR EMBEDDING MACHINE-READABLE CODES IN COMBINATION WITH OTHER IMAGES SUCH AS LOGOS.

BACKGROUND

Symbologies, such as matrix symbologies and two-dimensional barcodes, have become a widely accepted tool for sharing small amounts of data, and for tracking objects that are marked with the symbology. Examples of symbologies include Universal Product Codes (UPC), data matrix codes, Quick Response (QR) codes, Aztec codes, Maxi codes, and the like.

A symbology may be scanned and read by a wide variety of devices, including, but not limited to, cellular telephones, digital cameras, smartphones, personal digital assistants, tablet devices, electronic readers, personal computers and portable satellite navigation devices. The generation of the various symbologies are governed by established international standards, e.g. ISO/IEC 18004:2006 covering QR codes.

QR codes have become a widely accepted method for printing mechanically readable encoded data. The codes can be used in official documents such as certificates and diplomas to verify the authenticity. For example, assigning a unique QR code to an official document and tying authentication data to the code allows for the validation of the document. The barcodes are typically printed as an independent entity in the page, separated from other objects such as pictures, text, graphics, and logos. Therefore, it is desirable to have QR codes embedded in documents in a way that is aesthetically more appealing.

SUMMARY

A method and system of embedding a barcode in a document image are disclosed. The method includes receiving a data file comprising data representative of a document image and a barcode file comprising data representative of a barcode. A segmented image is formed by separating a background region of the document image from one or more foreground regions of the document image. A texture image that includes a plurality of copies of the barcode is generated by replicating the barcode so that the texture image has a size that extends at least to a predetermined portion of the document image. A modulation index map is generated from the segmented image. An output image is generated by combining the document image with the textured image based on the modulation index map.

In another aspect, an electronic device includes a processor and a computer-readable memory containing a barcode image embedding application comprising programming instructions. The program instructions are capable of instructing the processor to form a segmented image by separating a background region of the document image from one or more foreground regions of the document image. The processor is also instructed to generate a texture image comprising a plurality of copies of the barcode by replicating the barcode so that the texture image has a size that extends at least to a predetermined portion of the document image. A modulation index map is generated from the segmented image. An output image is generated by modulating the original image based on the textured image and the modulation index map.

In another aspect, a computer program product contains a set of instructions that, when executed, instruct a processor of an electronic device to implement a method of embedding a barcode in a document image. The method includes determining a location to embed the barcode in the document image by selecting a polygon having a size that corresponds to a size of the barcode and which is located entirely within the background region. The method also includes generating a texture image comprising a plurality of copies of the barcode by replicating the barcode so that the texture image has a size that extends at least to a predetermined portion of the document image. A segmented image is generated by separating a background region of the document image from one or more foreground regions of the document image. A modulation index map is generated from the segmented image. An output image is generated by modulating the original image based the textured image, a required symbol contrast, and the modulation index map.

DETAILED DESCRIPTION

Figure 1:
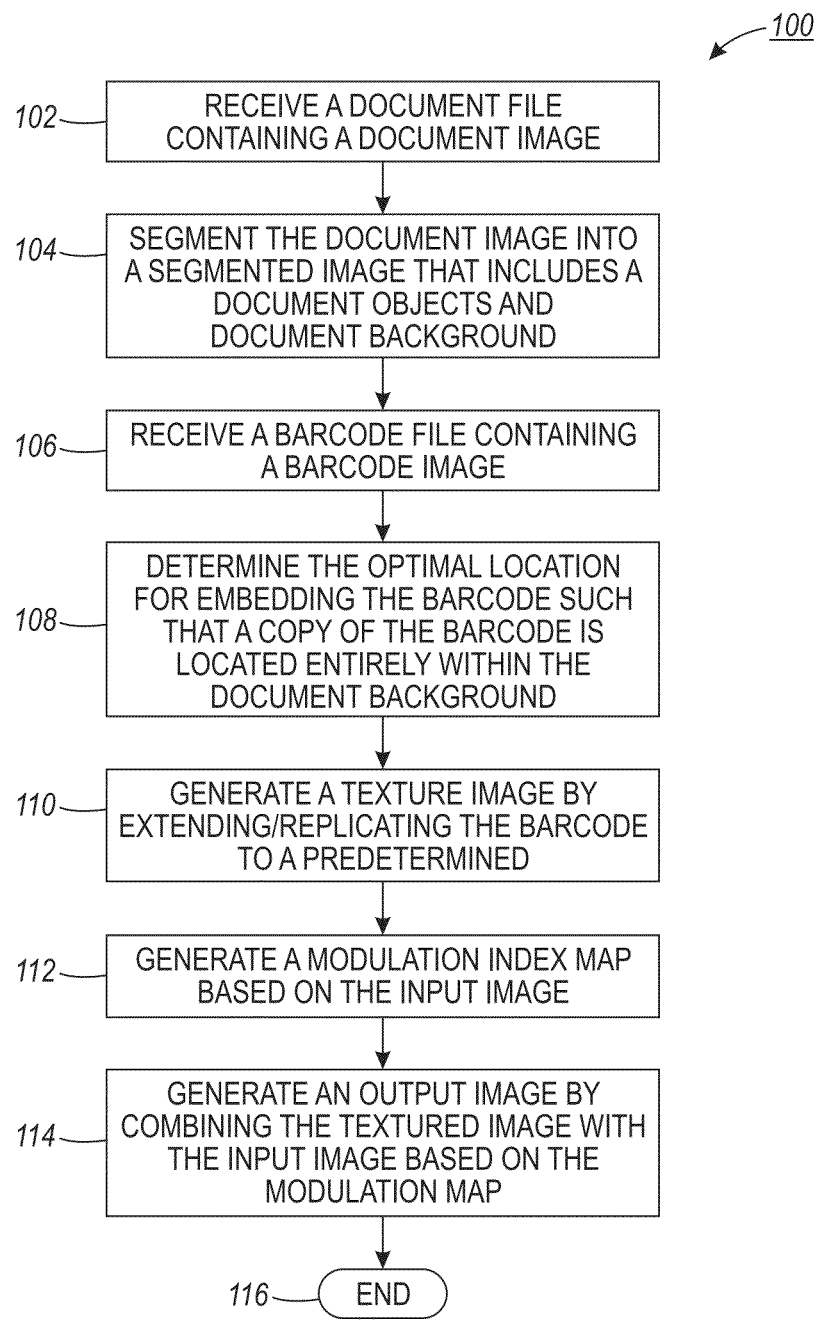
FIG. 1 is a flowchart summarizing an image-processing method in accordance with an aspect of the present disclosure.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The term "data" may refer to physical signals that indicate or include information. A "data bit" may refer to a single unit of data. An "image," as a pattern of physical light or a collection of data representing the physical light, may include characters, words, symbologies, graphics and other features, as well as combinations thereof. A "digital image" is by extension an image represented by a collection of digital data. A "logo" refers to one or more graphical elements and/or any combination thereof.

A "barcode" is a pattern or symbol that that is displayed on a surface and which represents data. Barcodes may be an optical, machine-readable representation of data. Barcodes may include, without limitation, one-dimensional symbologies, two-dimensional (2D) symbologies, or three-dimensional symbologies. Examples of two-dimensional barcodes include data matrix codes, quick response codes, Aztec codes, Maxi codes and the like. The barcodes may be displayed on an electronic display, and may be of any geometric shape or size. In this document, the terms "barcode" or "matrix code" may be used in the examples, but the term is intended to include any such symbology. For the purposes of this application, a "copy" of a barcode refers to at least a portion of the barcode sufficient to allow the barcode to be fully read by a machine or scanner.

A "gamut" refers to a subset of colors which can be accurately represented in a particular medium. For example, a "printer gamut" refers to the subset of chromaticities that can be reproduced by a particular printer. An "image gamut" refers to a subset of colors from the printer gamut that are present in a given image produced by the printer. A "virtual gamut" refers to a set of colors calculated from the average reflectance of combined light and dark color pairs that selected from the printer gamut. The term "average" as used herein refers to a value approximately intermediate to two values.

An "electronic device" refers to a device that includes an imaging device, a processor and tangible, computer-readable memory. The memory may contain programming instructions in the form of a software application that, when executed by the processor, causes the device to perform one or more barcode scanning operations according to the programming instructions. Examples of suitable devices include portable electronic devices such as smartphones, personal digital assistants, cameras, tablet devices, electronic readers, personal computers, media players, satellite navigation devices and the like.

In this disclosure, a method for embedding a barcode into a document background is presented. The proposed method is compatible with the various barcode decoding technologies. For example, the resulting barcodes may be readable by standard decoders, including both laser and imaging readers. Although the illustrated method is focused on two-dimensional or quick response (QR) codes, it is extensible to other barcode systems, such as Data Matrix.

Figure 8:
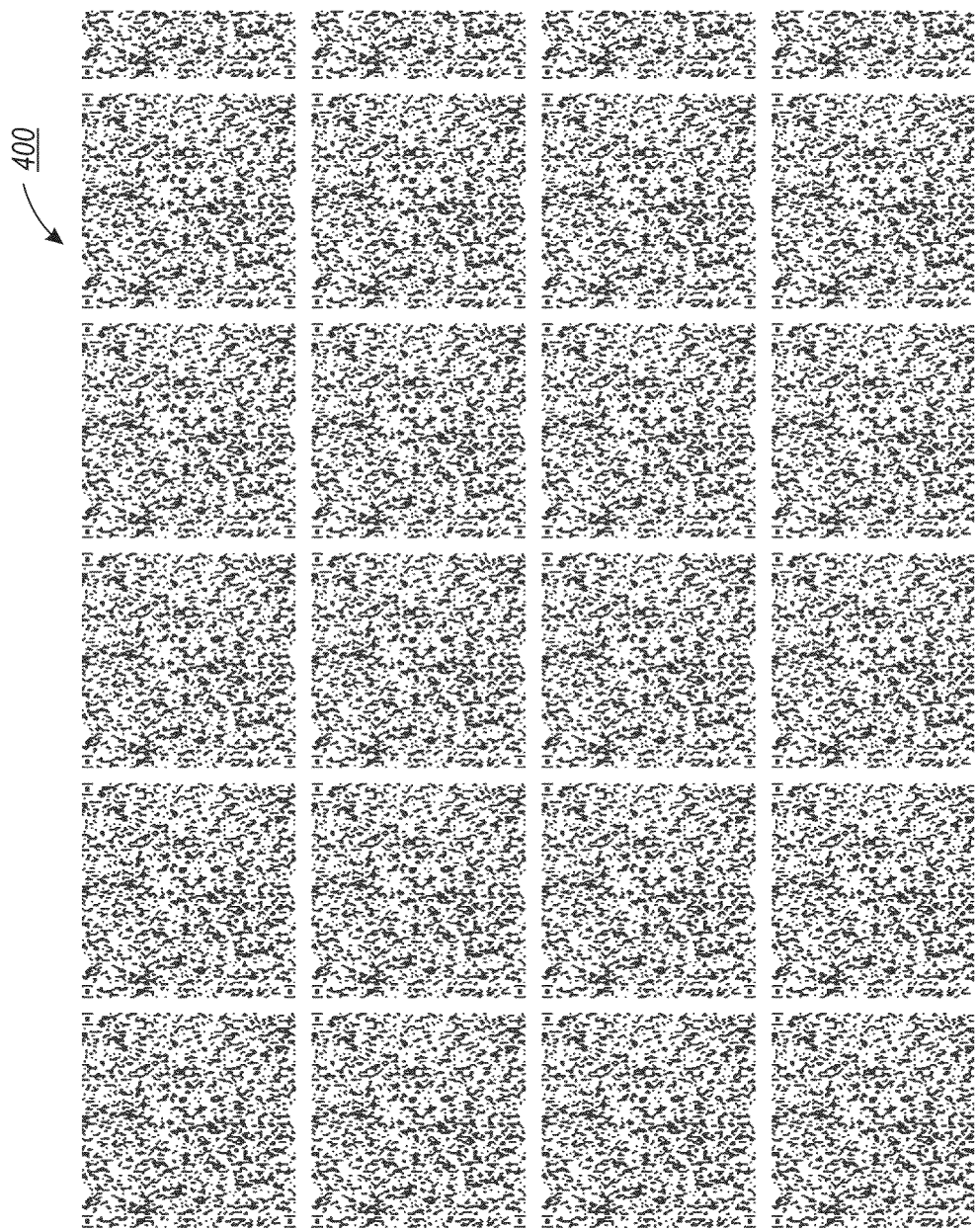
FIG. 8 is an illustration of one embodiment of a set of barcodes replicated to form a texture image in accordance with an aspect of the present disclosure.

FIG. 1 is a flowchart summarizing a process 100 in accordance with an embodiment of the present disclosure. Process 100 begins at step 102 where a document file is received that contains a document image. The process continues to step 104 where the objects in the document image are segmented from the document background to form a segmented image. In step 106, the process 100 determines an optimal location for embedding the barcode. In an embodiment, it may be an area located entirely in the background region. After the optimal location is determined and the barcode is placed in the determined optimal location, a texture image is produced in step 108 by extending (i.e. replicating) the barcode to a size that covers a predetermined portion of the document background. A texture image is an image made up of multiple copies of a barcode or segments of the barcode, including at least one complete copy of the barcode. An example of a texture image is shown in FIG. 8.

A modulation index map is created in step 110 based on the segmented image. A modulation index map includes a modulation index stored value for each pixel in the image. The modulation index is calculated based on the distance between the pixel and the nearest pixel associated with an object as determined during the image segmentation in step 104. After the modulation index map has been generated the process 100 continues to step 112 where an embedded image is generated by combining the input image and the texture image based on the modulation index map. After the embedded image is generated, the process proceeds to step 114 where the process ends.

Figure 2:
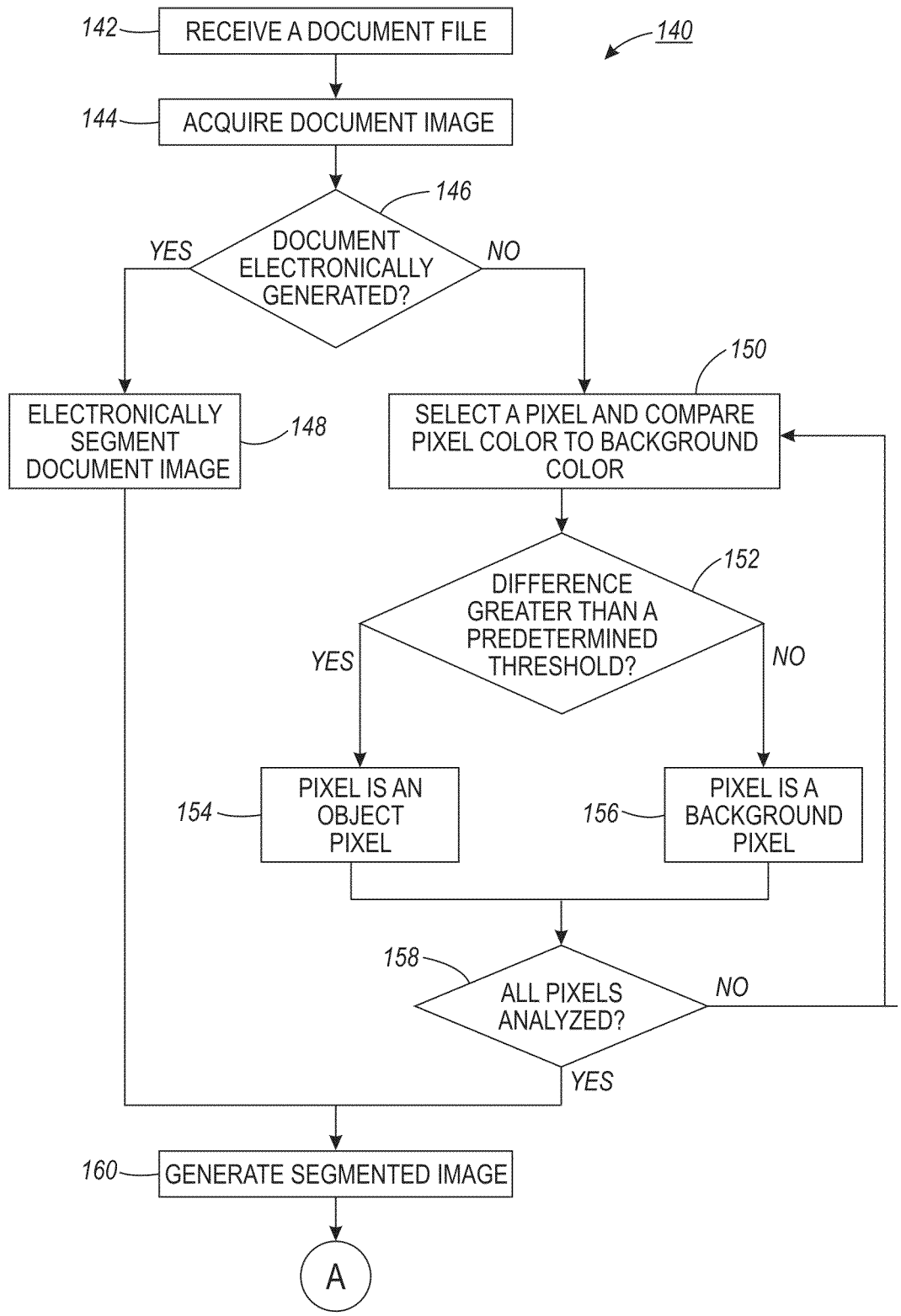
FIG. 2 is a flowchart summarizing an image processing method in accordance with an aspect of the present disclosure.
Figure 3:
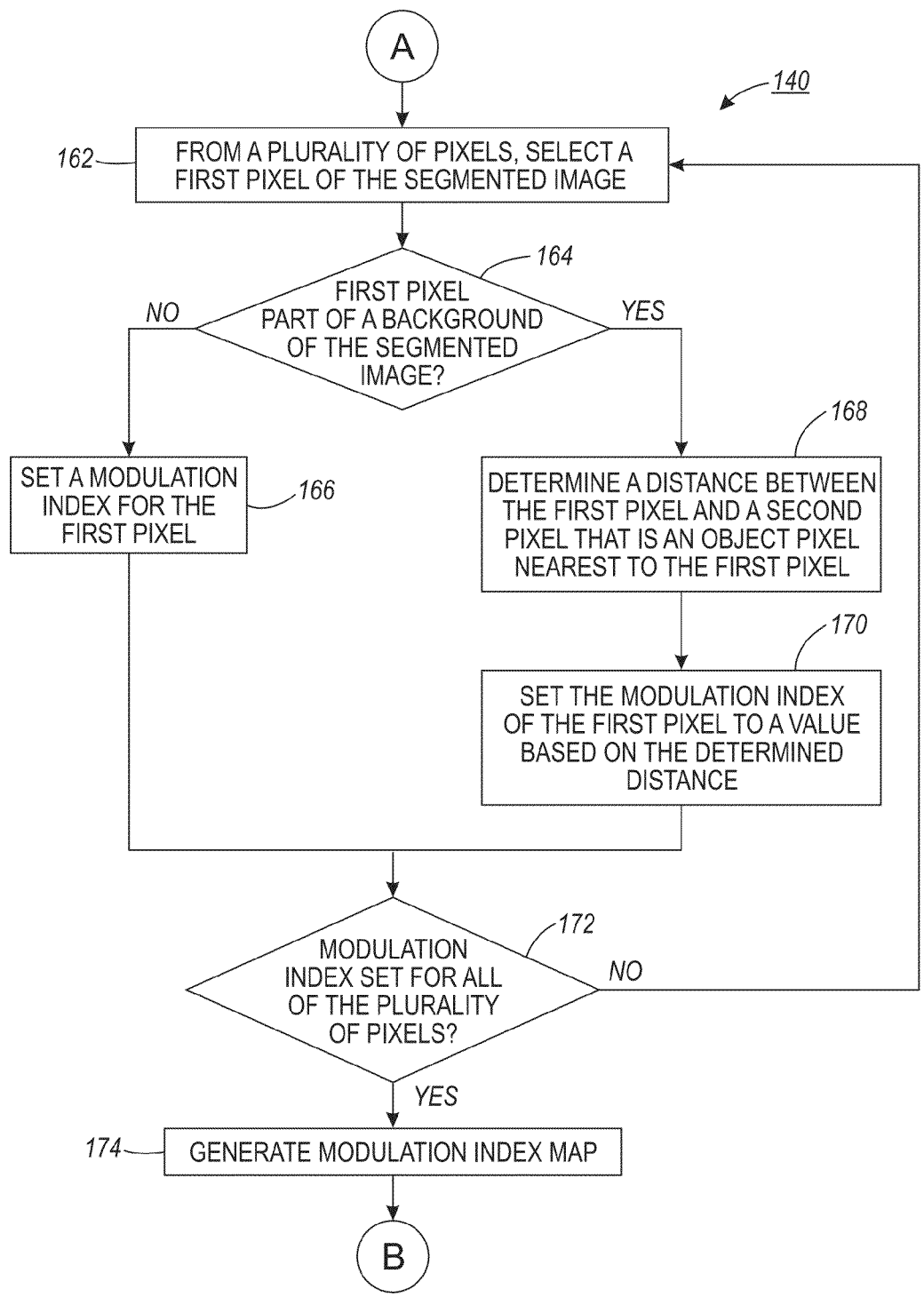
FIG. 3 is a flowchart summarizing an image processing method in accordance with an aspect of the present disclosure.
Figure 4:
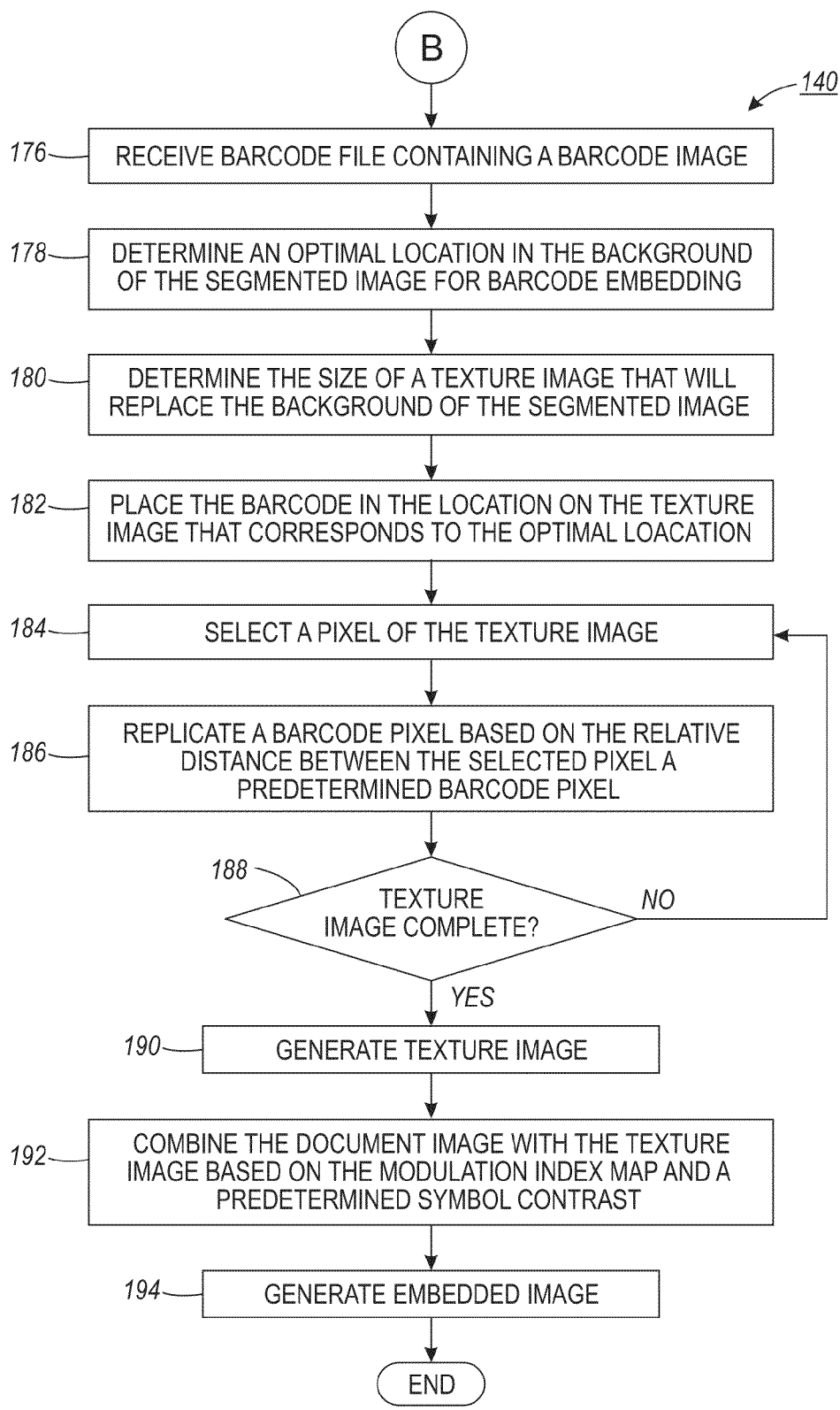
FIG. 4 is a flowchart summarizing an image processing method in accordance with an aspect of the present disclosure.

Referring now to FIGS. 2-4, a series of flowcharts are presented that illustrate a process 140 in accordance with an embodiment of the present disclosure. Process 140 is similar to process 100 discussed above but provides additional detail. Referring to FIG. 2, a portion of process 140 is presented that segments a document image. A document image is a digital representation of the visual information in a document. A document image may include a background and a number of objects, i.e. words, pictures, logos, colors, and the like. As explained above, a segmented image is created by separating the document background from the document objects.

Figure 5:
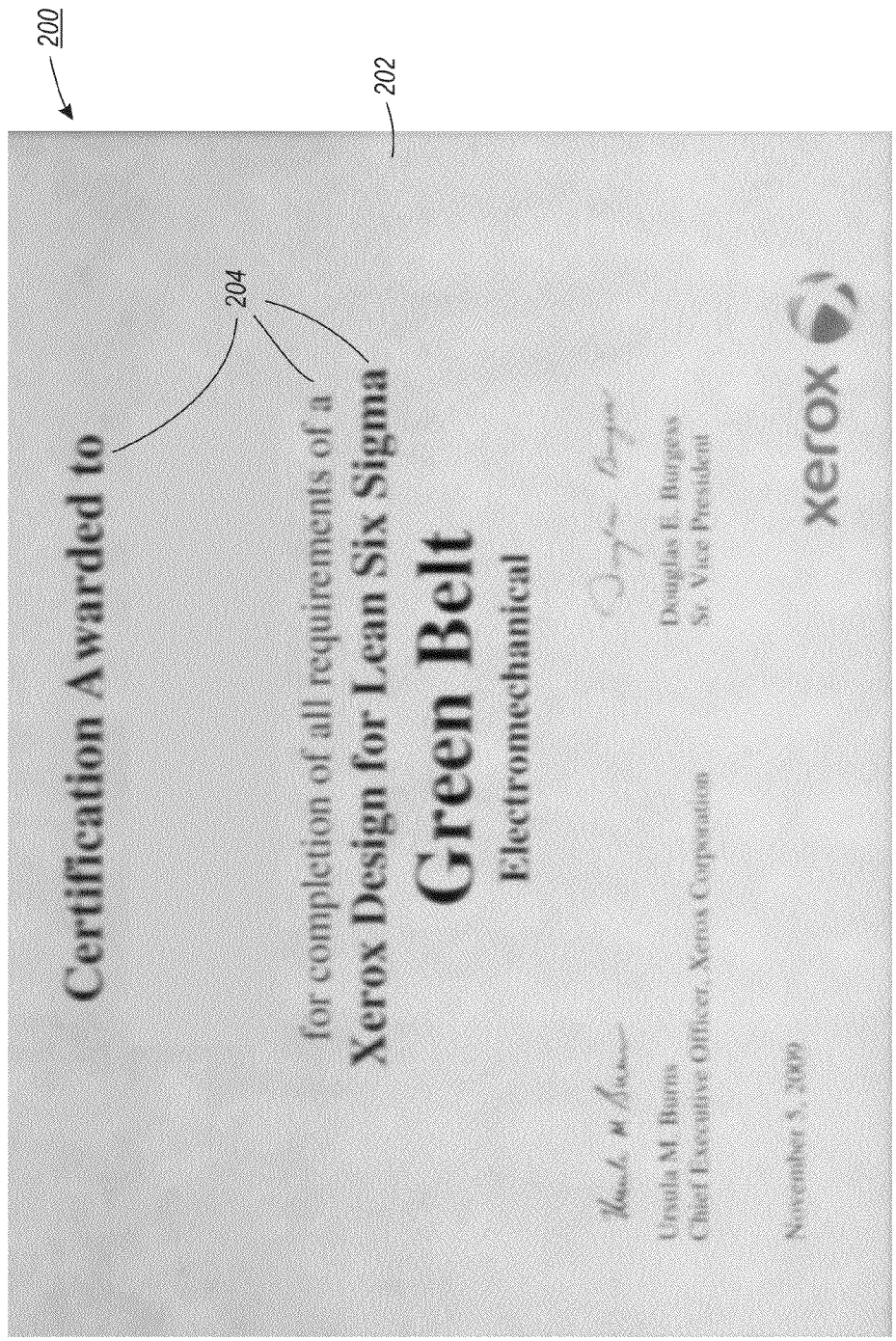
FIG. 5 is an illustration of an original input image in accordance with an aspect of the present disclosure.
Figure 6:
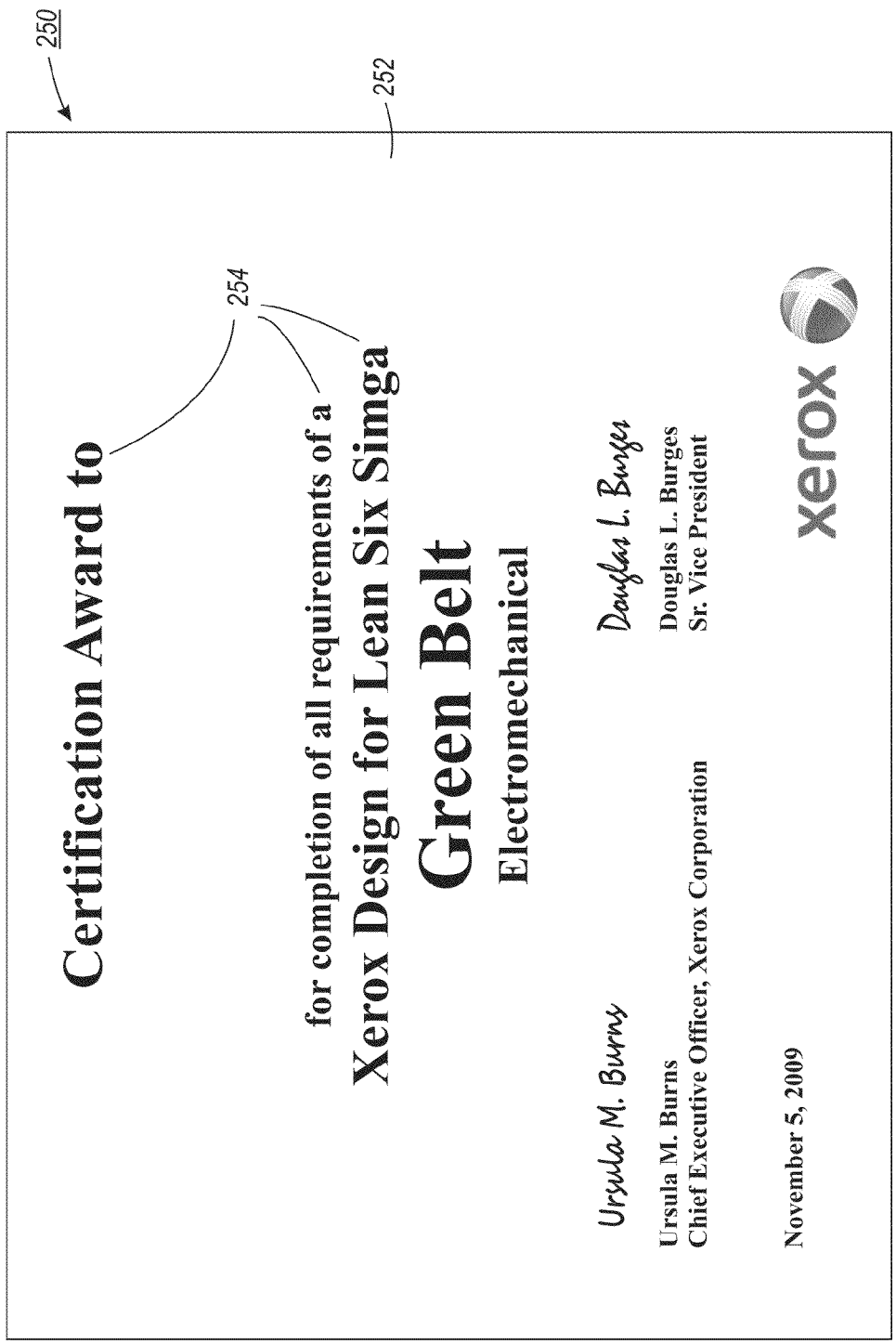
FIG. 6 is an illustration of a segmented image in accordance with an aspect of the present disclosure.

The process 140 begins at step 142 where a document file is received. The method continues to step 144 where a document image is acquired from the document file. The document image may be a digital version of a hardcopy document or may be an electronically generated document. For an electronically generated document, the information about the objects is often available and the segmentation is trivial. For a scanned document, i.e. acquired by a scanner or a digital camera, the segmentation can be achieved by locally comparing the pixel color to the background color. If the difference is smaller than a threshold, the pixel belongs to the background. Otherwise it is a part of an object. FIG. 5 shows a document image 200 that includes an document background 202 and document objects 204. FIG. 6 shows the segmentation results. As shown in FIG. 6, the segmented image includes segmented background 252 and segmented objects 254.

In step 146, it is determined whether the document was electronically generated. An electronic document is electronically generated. If so (146: Yes), then the document image is electronically segmented and the process continues to step 160. If the document was not electronically generated (146: No), the document image is segmented using a sub process that begins at step 150. A pixel is selected and the color of the pixel is compared to the background color. If the difference between the pixel color and the background color is greater than a predetermined threshold (152: Yes), the pixel is determined to be an object pixel in step 154. If, however, the difference is smaller than the predetermined threshold (152: No), the pixel is determined to be a background pixel in step 156. The process continues to step 158 where it is determined if all pixels in the document image have been analyzed. If not (158: No), the process returns to step 150 to analyze another pixel. If all pixels have been analyzed (158: Yes), the process continues to step 160 where the segmented image is generated.

Referring now to FIG. 3, a portion of process 140 that generates the modulation index map is presented. The process 140 continues to step 162, where a pixel of the segmented image is selected. In an embodiment, the pixel is selected from a set of pixels of the segmented image. The set may include some or all pixels of the segmented image. The embodiments are not limited in this regard. After the pixel is selected, the process 140 continues to step 164 where it is determined whether the pixel is part of the background of the segmented image, i.e. is the pixel part of an object of the segmented image ("object pixel"). If the pixel is not in the background of the segmented image (164: No), the process 140 continues to step 166 where a modulation index is set at a minimum value for the pixel. In an embodiment, all object pixels are assigned a modulation index of 0. Alternatively, if the pixel is part of the background of the segmented image (164: Yes), the process 140 continues to step 168 where a distance is determined between the pixel and the nearest object to the selected pixel. The nearest object is found by locating the object pixel nearest to the selected pixel. In step 170, the modulation index is set to a value based on the distance determined in step 168. Once the modulation index is set to the proper value, the process 140 checks whether all pixels in the set have been assigned a modulation index. If not (172: No), then the process returns to step 162 for the selection of another pixel. If all pixels in the set of pixels have a modulation index assigned (172: Yes), the process continues to step 174 where the modulation map is output.

In an embodiment, the modulation index map has the following properties. Each pixel has a modulation index value $m(x,y)$ in the range of $[0, 1]$. If $(x,y)$ is a pixel in an object, then $m(x,y)=0$. However, if $(x,y)$ is a pixel in the background, then $m(x, y)$ is determined by its distance to the nearest object pixel. The greater the distance, the larger the $m(x,y)$ value. In one implementation, $m(x,y)$ is calculated as $$m(x, y) = \min_{x',y'}[(x - x')^2 + (y - y)^2];$$ (Equation 1)

where the first minimization is performed over all pixels $(x', y')$ that are segmented as a part of an object. The value of $m(x,y)$ is set to zero, if the calculation from Equation 1 is negative.

Referring now to FIG. 4, a portion of process 140 that generates the texture image and the embedded image is presented. The process 140 continues to step 176 where a barcode file is received that contains a barcode image. The optimal location for barcode embedding is determined in step 178. In an embodiment, it may be an area located entirely in the background region. If multiple potential locations exist, the one with maximum distance from neighboring objects is chosen. It is assumed that $(x_0, y_0)$ is the top left corner of the square for embedding the barcode, and that the image is read from top to bottom. Referring again to FIG. 6, the area that would meet these requirements is the top left corner of background 252. As discussed above, the optimal location may be an area that is entirely within the background and is furthest from any objects in the document. However, the embodiments of the present disclosure are not limited in this regard. In step 180, the desired size of the texture image is determined. In an embodiment, the size may be large enough to cover the entire document background. Alternatively, the size may be smaller than the document background so that, in the embedded image, the texture background will only be present in part of the image. Again, the embodiments of the present disclosure are not limited in this regard. In step 182, the barcode is placed in a position that corresponds to the optimal location determined in step 178. The process 140 continues to step 184 where a pixel of the texture image is selected. As mentioned above, the texture image has a predetermined size and therefore has a predetermined number of pixels. The predetermined size may include some or all of the original input image background.

The selected pixel is to written with the value of a corresponding pixel within the barcode. In step 186, a barcode pixel is replicated based on a relative distance between the selected pixel and a predetermined barcode pixel. In an embodiment, the texture image is produced using the formula $$t(x,y)=b[(x-x_0)\%W,(y-y_0)\%H],$$ (Equation 2)

where $t(x,y)$ is the pixel value in the texture image;
$b(x,y)$ is the pixel value in the barcode image;
W is the width of the barcode;
H is the height of the barcode;
$(x_0,y_0)$ is the top left corner of the square for embedding the barcode; and
% is the modulo operation.

Equation 2 ensures that the barcode will be embedded at the right location selected in the second step of the algorithm. In this embodiment, the barcode is replicated by determining the relative distance between the pixel $(x_0,y_0)$ and each pixel $(x,y)$ and performing a modulo operation to find the corresponding pixel on the barcode to be replicated. The distance in each dimension is divided by the appropriate dimension of the barcode leaving a remainder. The remainders for each dimension (x and y) define which pixel of the barcode to copy to pixel $(x,y)$. For example, assume the barcode image is 100 pixels wide, $(x_0,y_0)$ is at pixel $(0,0)$, and $(x,y)$ is at pixel $(150, 150)$. In this example, Equation 1 produces the result $t(150, 150)=b[(150-0)\%100, (150-0)\%100]=b(50,50)$. Therefore, the texture image pixel at $(150,150)$ is a copy of the barcode pixel at $(50,50)$.

Figure 7:
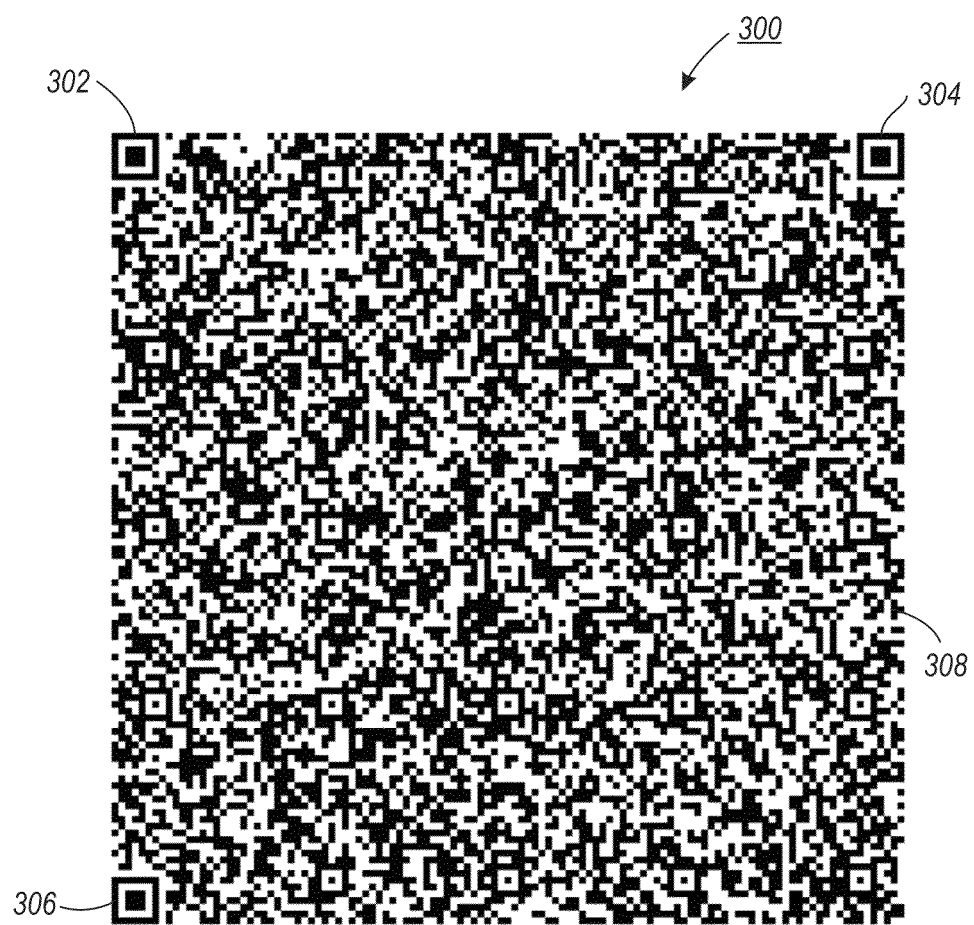
FIG. 7 is an illustration of a barcode in accordance with an aspect of the present disclosure.

In step 188, it is determined whether the texture image is complete, i.e. whether all pixels in the texture image have been written. If not (188: No), the process returns to step 184 where another pixel is selected. If all pixels in the texture image have been written (188: Yes), the texture image is output in step 190. Referring to FIG. 7, a barcode 300 is shown. In an embodiment, barcode 300 is a QR code and generated according to a standard promulgated by the International Organization for Standards (ISO), e.g. ISO/IEC 18004: 2006. The barcode 300 may contain one or more position detection elements 302, 304, 306 and a data portion 308 made of a set of informational elements. Each element may be a pixel or a group of pixels. FIG. 8 shows the texture image 400 generated by applying Equation 1 to barcode 300.

In step 192, the process 140 combines the document image acquired in step 144 with the texture image generated in step 190 based on the modulation index map generated in step 174. In step 194, the embedded image is generated. In an embodiment, input image is first converted to YCbCr space, or other spaces containing a Y component. The two chromatic components (Cb and Cr in the YCbCr space) remain unchanged. The Y component in the resulting image is calculated as $$r(x,y)=i(x,y)+\Delta m(x,y)[t(x,y)-0.5]+C;\quad\text{(Equation 3)}$$

where i(x,y) is the input image;
t(x,y) is the texture image;
m(x,y) is the modulation mask;
Δ is the required symbol contrast; and
C is a constant.

Figure 9:
FIG. 9 is an illustration of an output image in accordance with an aspect of the present disclosure.

The symbol contrast is predetermined by selecting one of the following values based on the symbol grade required: Δ≥0.7; Δ≥0.55; Δ≥0.4; Δ≥0.2; and Δ≥0.2, for Grade A, B, C, and D symbols, respectively. In an embodiment, constant c is added to ensure that the result is in the required range, e.g. [0, 255] for 8-bit images. The constant C is determined based on the Y component values of the background pixels. FIG. 9 shows output image 500, including a frame 510. In the embodiment illustrated in FIG. 9, a symbol contrast Δ of 0.4, i.e. grade C, was selected.

Figure 10:
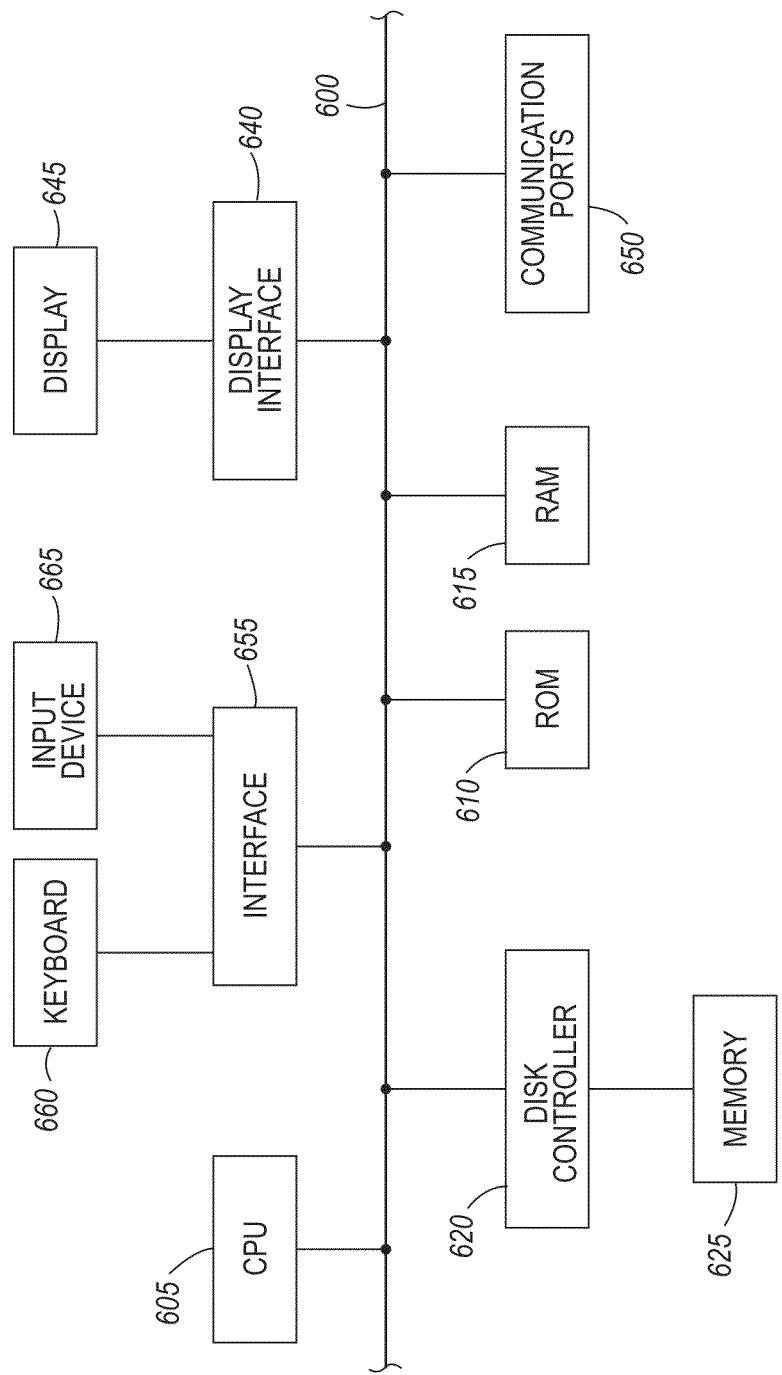
FIG. 10 is a block diagram depicting elements that may be present in an electronic device or a computing device in accordance with an aspect of the present disclosure.

FIG. 10 depicts a block diagram of internal hardware that may be used to contain or implement the process discussed above. A bus 600 serves as the main information highway interconnecting the other illustrated components of the hardware. CPU 605 is a processor, the central processing unit of the system that performs calculations and logic operations required to execute a program. CPU 605, alone or in conjunction with one or more of the other elements disclosed in FIG. 10, is a processing device, computing device or processor as such terms are used within this disclosure. Read only memory (ROM) 610 and random access memory (RAM) 615 constitute exemplary memory devices.

A controller 620 provides an interface between with one or more optional tangible, computer-readable memory devices 625 and the system bus 600. These memory devices 625 may include, for example, an external or internal DVD or CD ROM drive, a hard drive, flash memory, a USB drive or the like. As indicated previously, these various drives and controllers are optional devices. Additionally, the memory devices 625 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the methods and systems as discussed above may be stored in the ROM 610 and/or the RAM 615. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface 640 may permit information from the bus 600 to be displayed on the display 645 in audio, visual, graphic or alphanumeric format. The information may include information related to a current job ticket and associated tasks. Communication with external devices may occur using various communication ports 650. A communication port 650 may be attached to a communications network, such as the Internet or an local area network.

The hardware may also include an interface 655 which allows for receipt of data from input devices such as a keyboard 660 or other input device such as a mouse 665, a joystick, a touch screen, a remote control, a pointing device, a video input device and/or an audio input device.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method of embedding a barcode in a document image, comprising, by a processor:
   receiving a data file comprising data representative of a document image;
   receiving a barcode file comprising data representative of a barcode;
   forming a segmented image by separating a background region of the document image from one or more foreground regions of the document image;
   generating a texture image comprising a plurality of copies of the barcode by replicating the barcode so that the texture image has a size that extends at least to a predetermined portion of the document image;
   generating a modulation index map from the segmented image; and
   generating an output image by combining the document image with the textured image based on the modulation index map.

2. The method of claim 1, wherein forming the segmented image comprises:
   analyzing the color value for a plurality of pixels in the document image;
   identifying a background color value;
   assigning to the background region a set of the pixels having color values that are no more than a threshold distance away from the background color value; and
   assigning to the foreground region a set of the pixels having color values that are equal to or greater than the threshold distance away from the background color value.

3. The method of claim 1, further comprising:
   determining a location to embed the barcode in the document image by selecting a polygon having a size that corresponds to a size of the barcode and which is located entirely within the background region, wherein generating the texture image comprises positioning one of the copies of the barcode in the polygon.

4. The method of claim 3, wherein generating a texture image further comprises positioning, relative to the copy of the barcode positioned in the polygon, the additional copies of the barcode in at least a portion of the background region.

5. The method of claim 3, wherein the additional copies of the barcode are generated by:
   selecting a texture image pixel and determining a two dimensional location of the pixel relative to a reference pixel within the polygon;
   calculating a horizontal remainder by dividing the horizontal distance between the texture image pixel and the reference pixel by the width of the barcode;
   calculating a vertical remainder by dividing the vertical distance between the texture image pixel and the reference pixel by the height of the barcode; and
   copying a barcode pixel from a location on the barcode determined from the horizontal and vertical remainders.

6. The method of claim 1, wherein generating a modulation index map further comprises:
   selecting a first pixel of the segmented image; and
   determining whether the first pixel is part of a background of the segmented image.

7. The method of claim 6, further comprising:
   on a condition that the first pixel is not part of the background, set a modulation index of the first pixel to a minimum value.

8. The method of claim 7, further comprising:
on a condition that the first pixel is part of the background, determine a distance between the first pixel and a second pixel, wherein the second pixel is an object pixel nearest to the first pixel; and
set a modulation index of the first pixel to a value based on the determined distance.

9. The method of claim 1, wherein generating the output image further comprises:
selecting a required symbol contrast;
selecting an output image pixel; and
determining a value for the output image pixel based on a corresponding document image pixel and a product of the required symbol contrast and the modulation index map value for the output image pixel.

10. An electronic device, comprising:
a processor; and
a computer-readable memory containing a barcode image embedding application comprising programming instructions that instruct the processor to:
form a segmented image by separating a background region of the document image from one or more foreground regions of the document image;
generate a texture image comprising a plurality of copies of the barcode by replicating the barcode so that the texture image has a size that extends at least to a predetermined portion of the document image;
generate a modulation index map from the segmented image; and
generate an output image by modulating the original image based on the textured image and the modulation index map.

11. The electronic device of claim 10, wherein the computer-readable memory further includes programming instructions to form the segmented image by instructing the processor to:
analyze the color value for a plurality of pixels in the document image;
identify a background color value;
assign to the background region a set of pixels having color values that are no more than a threshold distance away from the background color value; and
assign to the foreground region a set of pixels having color values that are equal to or greater than the threshold distance away from the background color value.

12. The electronic device of claim 11, wherein the computer-readable memory further includes programming instructions to instruct the processor to determine a location to embed the barcode in the document image by selecting a polygon having a size that corresponds to a size of the barcode and which is located entirely within the background region.

13. The electronic device of claim 12 wherein the computer-readable memory further includes programming instructions to instruct the processor to:
selecting a texture image pixel and determining a two dimensional location of the pixel relative to a reference pixel within the polygon;
calculating a horizontal remainder by dividing the horizontal distance between the texture image pixel and the reference pixel by the width of the barcode;
calculating a vertical remainder by dividing the vertical distance between the texture image pixel and the reference pixel by the height of the barcode; and
copying a barcode pixel from a location on the barcode determined from the horizontal and vertical remainders.

14. The electronic device of claim 13, wherein the computer-readable memory further includes programming instructions to instruct the processor to:
selecting a first pixel of the segmented image; and
determining whether the first pixel is part of a background of the segmented image.

15. The electronic device of claim 10, wherein the computer-readable memory further includes programming instructions to instruct the processor to determine a value for a selected output image pixel based on a corresponding document image pixel and a product of a required symbol contrast and the modulation index map value for the selected output image pixel.

16. The electronic device of claim 15, wherein the computer-readable memory further includes programming instructions to instruct the processor to:
on a condition that the first pixel is not part of the background, set a modulation index of the first pixel to a minimum value; and
on a condition that the first pixel is part of the background, determine a distance between the first pixel and a second pixel, wherein the second pixel is an object pixel nearest to the first pixel; and
set a modulation index of the first pixel to a value based on the determined distance.

17. A computer program product containing a set of instructions that, when executed, instruct a processor of an electronic device to implement a method of embedding a barcode in a document image, wherein the electronic device includes, a processor and a computer-readable memory, the method comprising:
determining a location to embed the barcode in the document image by selecting a polygon having a size that corresponds to a size of the barcode and which is located entirely within the background region;
generating a texture image comprising a plurality of copies of the barcode by replicating the barcode so that the texture image has a size that extends at least to a predetermined portion of the document image;
forming a segmented image by separating a background region of the document image from one or more foreground regions of the document image;
generating a modulation index map from the segmented image; and
generating an output image by modulating the original image based the textured image, a required symbol contrast, and the modulation index map.

18. The computer program product of claim 17, wherein the method further comprises:
selecting a first pixel of the segmented image; and
determining whether the first pixel is part of a background of the segmented image.

19. The computer program product of claim 18, wherein the method further comprises:
on a condition that the first pixel is not part of the background, setting a modulation index of the first pixel to a minimum value; and
on a condition that the first pixel is part of the background, determining a distance between the first pixel and a second pixel, wherein the second pixel is an object pixel nearest to the first pixel; and
setting a modulation index of the first pixel to a value based on the determined distance.

20. The computer program product of claim 19, wherein the output image is generated by:
selecting a required symbol contrast;
selecting an output image pixel; and determining a value for the output image pixel based on a corresponding document image pixel and a product of the required symbol contrast and the modulation index map value for the output image pixel.

* * * * *